(12) United States Patent
Frederick

(10) Patent No.: US 8,215,056 B2
(45) Date of Patent: Jul. 10, 2012

(54) DEVICE FOR PREVENTING PLANT GROWTH AROUND POSTS

(76) Inventor: Daniel T. Frederick, Niagara Falls, NY (US)

( * ) Notice: Subject to any disclaimer, the term of this patent is extended or adjusted under 35 U.S.C. 154(b) by 356 days.

(21) Appl. No.: 12/460,805

(22) Filed: Jul. 24, 2009

(65) Prior Publication Data

US 2011/0258922 A1   Oct. 27, 2011

(51) Int. Cl.
*A01G 13/02* (2006.01)
(52) U.S. Cl. .......................................... 47/31.1; 47/32.3
(58) Field of Classification Search ............... 47/9, 20.1, 47/31.1, 32.1, 32.4
See application file for complete search history.

(56) References Cited

U.S. PATENT DOCUMENTS

| | | | |
|---|---|---|---|
| 219,987 A | 9/1879 | Scott | |
| 602,941 A | 4/1898 | Harvey | |
| 1,235,520 A | 7/1917 | Kirfman | |
| 1,674,118 A | 6/1928 | Merrick | |
| 1,916,494 A | 7/1933 | Schrickel | |
| 1,931,602 A * | 10/1933 | Colman | 47/32 |
| 3,515,373 A | 6/1970 | Abbe | |
| 3,571,972 A | 3/1971 | Carter, Jr | |
| 3,619,944 A | 11/1971 | Matvey | |
| 3,803,760 A | 4/1974 | Matvey | |
| 4,268,992 A | 5/1981 | Scharf, Sr. | |
| 4,800,676 A | 1/1989 | Lockwood, Sr. | |
| 4,934,093 A | 6/1990 | Yanna | |
| 5,085,001 A | 2/1992 | Crawley | |
| 5,323,557 A | 6/1994 | Sonntag | |
| 5,396,731 A * | 3/1995 | Byrne | 47/32 |
| 5,502,921 A | 4/1996 | Hyslop | |
| 5,528,855 A | 6/1996 | Kapphahn | |
| 5,586,753 A | 12/1996 | Michaels | |
| 5,746,031 A | 5/1998 | Burns | |
| 5,794,378 A | 8/1998 | Beatrez | |
| 5,878,528 A | 3/1999 | Pattyn | |
| D440,833 S * | 4/2001 | Tanner | D8/1 |
| 6,276,869 B1 | 8/2001 | Yakushinji | |
| 6,349,500 B1 | 2/2002 | Popham | |
| 6,412,217 B1 | 7/2002 | Hynninen | |
| 6,446,400 B1 | 9/2002 | Block et al. | |
| 6,536,158 B2 | 3/2003 | Rice | |
| 6,705,044 B2 | 3/2004 | Clancey | |
| 6,754,989 B2 | 6/2004 | Eicher | |
| 6,837,487 B1 | 1/2005 | Oden et al. | |
| 7,013,597 B1 | 3/2006 | Dominguez | |
| 7,032,888 B1 | 4/2006 | Adair | |
| 7,104,525 B2 | 9/2006 | Ricci | |
| 2002/0189161 A1 | 12/2002 | Rice | |
| 2008/0202023 A1 | 8/2008 | Moore | |

* cited by examiner

*Primary Examiner* — Frank T Palo
(74) *Attorney, Agent, or Firm* — James C. Simmons

(57) ABSTRACT

A device for preventing plant growth around a post, comprising an opaque sheet, an opening in the sheet, and a slit extending entirely from the opening to the perimetric edge. A fastener structure is arranged to fasten one of the edge portions to an other of the edge portions in a relationship wherein the edge portions overlap thereby effecting a slope of the sheet downwardly from the opening to the perimetric edge and wherein the opening is shaped to have a first shape when the edge portions are not overlapping and to have a second shape to conform to the post when the edge portions are fastened in the overlapping relationship.

20 Claims, 3 Drawing Sheets

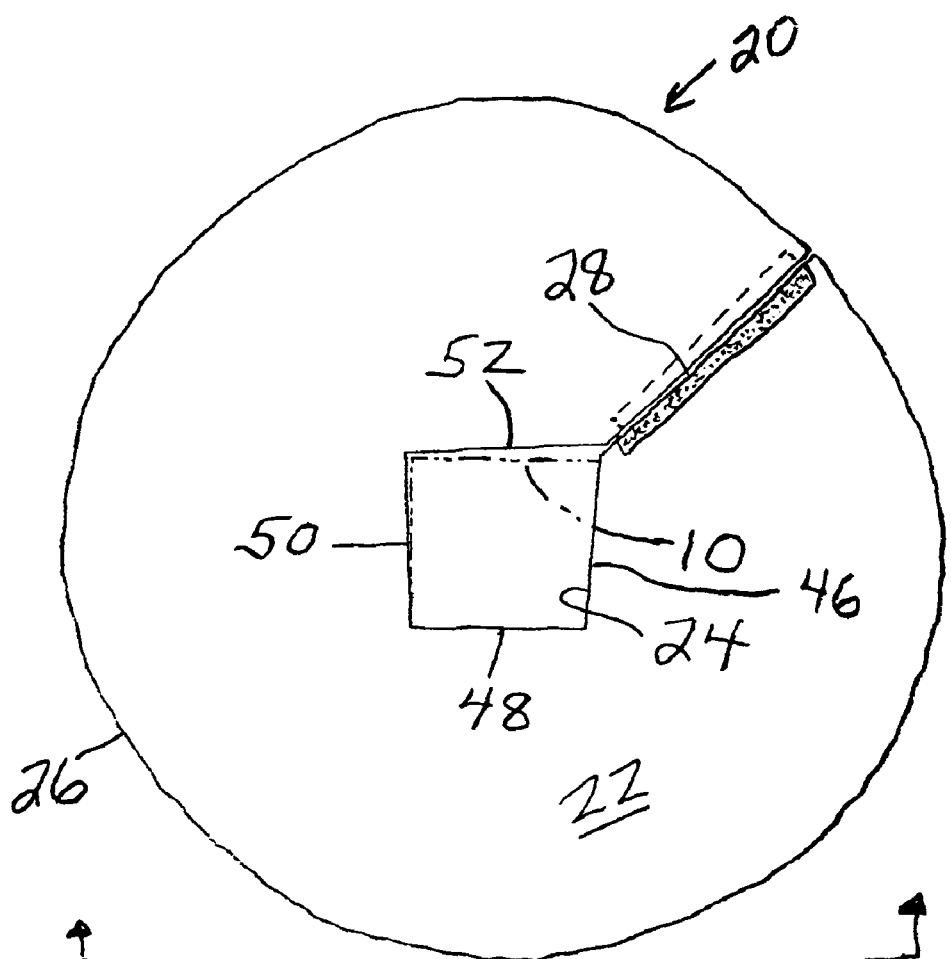
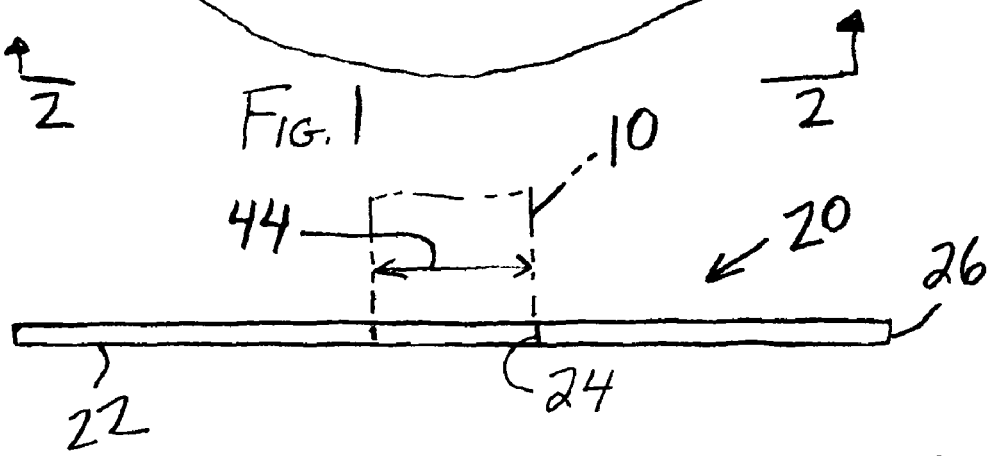

DEVICE FOR PREVENTING PLANT GROWTH AROUND POSTS

The present invention is directed generally to the prevention of plant growth around posts and the like. Devices for such a purpose have typically included opaque discs which are laid on the ground around the post and which have a hole in the center for enveloping the post. A slit extends from the hole to the perimetric edge to provide a means for placing the disc so that the post is received in the hole.

U.S. Pat. No. 3,571,972 discloses a protective ground collar for trees, fence posts, and other upright elements to inhibit the growth of vegetation. The collar is formed of flexible sheet material a suitable material described as felt material impregnated with polyurethane resin. The collar is colored to simulate the appearance of grass. A main opening is formed therein from which a slit extends to the outer edge for facilitating the envelopment of a tree trunk or the like, the opening being of the same configuration but slightly smaller than the trunk. An underlying or cover flap is provided to preclude vegetation growth through the slit. A plurality of inner slits extending outwardly from the opening define a plurality of flexible fingers which are shown to bend upwardly to be disposed against the tree trunk or post to inhibit plant growth. If the collar is of laminated construction, the slits in the two sheets are disposed out of coincidence so that the fingers are staggered. There is also disclosed a collar about a square post, wherein the opening is also smaller than the post and fingerlike elements lie against the sides respectively of the post. In order to insure that the collar will snugly envelope the post, the fingers are secured thereto by friction tape.

U.S. Pat. No. 5,323,557 discloses a landscaping mat having a similar slit for positioning the mat about a tree trunk wherein the slit edges are stepped and connected by screws or spikes. The outer portion is tapered so that the upper surface inclines downwardly as it extends outwardly.

U.S. Pat. No. 6,349,500 discloses a tree skirt having a similar slit for positioning the skirt about a tree trunk wherein the slit edges are connected by a tongue-in-groove connection and by pegs which fit in holes. The tree skirt has a generally convex upper surface.

U.S. Pat. No. 7,104,525 discloses a fence post protecting collar comprising a three-walled upright member and a fourth upright wall connected thereto by a tongue-in-groove connection and wherein a fluid-blocking rubber seal is contiguously positioned medially of the post and collar.

U.S. Pat. No. 7,013,597 discloses a tree ring to prevent vegetation growth around the trunks of trees. The tree ring comprises a flexible sheet having an elastic inner peripheral edge which snugly fits around the tree trunk.

U.S. Pat. No. 4,800,676 discloses a tree protector for preventing insects from crawling up the trunk. The tree protector includes a trough portion and a sealant mastic in combination with adhesive tape.

U.S. Pat. No. 6,276,869 discloses a weed control plate with a central opening to receive a support to cover the ground around the root to prevent the propagation of weeds and a parting line between the opening and the outer periphery, with means for joining the parting line edges together. The plate has a conical surface which is curved convexly upward toward radially inward of the plate.

U.S. Pat. No. 5,878,528 discloses a tree protector in the shape of a cone (convex upper surface) and comprised of two plastic moldings fitted together loosely about a tree trunk.

U.S. Pat. No. 6,412,217 discloses a tree shoe having a hole for a plant stem and a slit between the hole and the shoe edge, wherein the shoe is made convex.

A PERM-A-MULCH mulchmat manufactured by Phoenix Recycled Products of Batesburg, S.C. has been provided for protecting and beautifying trees and posts. It comprises a flat disc composed of rubber with a hole in the center and a seam from the hole to the outer periphery and is stated to be such that weeds can't grow but water and nutrients can pass right through. See their published application 2008/0202023.

Other U.S. patents which may be of interest to the present invention include U.S. Pat. Nos. 219,987; 602,941; 1,235,520; 1,674,118; 1,916,494; 3,515,373; 3,619,944; 3,803,760; 4,268,992; 4,934,093; 5,085,001; 5,502,921; 5,396,731; 5,528,855; 5,586,753; 5,746,031; 5,794,378; 6,349,500; 6,412,217; 6,446,400; 6,536,158; 6,705,044; 6,754,989; 6,837,487; and 7,032,888, and published application 2002/0189161.

All of the above patents/published applications are hereby incorporated herein by reference.

In order to keep undesired plant growth from occurring around a post or the like, it is considered important to completely block the passage of sunlight to the ground around the post. If not completely blocked, light can enter along the slit as well as along the edge of the central hole, undesirably causing weeds or grass to grow in these areas. It is also considered desirable to prevent rain water from accumulating on the disc, undesirably making it look dirty and increasing the likelihood of undesired plant growth. The discs disclosed in the above patents/published applications are considered to not adequately block sunlight and/or not adequately prevent the accumulation of rain water thereon.

Accordingly, it is an object of the present invention to provide a device for completely blocking the passage of sunlight to the ground around a post or the like.

It is another object of the present invention to prevent the accumulation of rain water on the sunlight-blocking device.

It is a further object of the present invention to provide such a device which is rugged, reliable, inexpensive, and environmentally friendly.

In order to completely block the passage of sunlight to the ground around a post or the like while also preventing the accumulation of rain water, in accordance with the present invention, an opaque sheet having an opening for placing around the post and a slit from the opening to the perimetric edge is provided with a pair of overlapping and attachable edge portions defining the slit, wherein the opening is shaped to have a first shape when the edge portions are not overlapping and to have a second shape to conform to the post when the edge portions are fastened in the overlapping relationship, whereby the sheet is shaped to be inclined downwardly to the perimetric edge when the edge portions are fastened in the overlapping relationship. Preferably, an elastomeric material is provided along the edges of the opening or the portion of the sheet defining the opening is composed of elastomeric material in order to better conform the sheet to the post.

The above and other objects, features, and advantages of the present invention will be apparent in the following detailed description of the preferred embodiment thereof when read in conjunction with the appended drawings in which the same reference numerals depict the same or similar parts throughout the several views.

BRIEF DESCRIPTION OF THE DRAWINGS

FIG. 1 is a plan view of a device which embodies the present invention, illustrated in a first shape before being placed around a post.

FIG. 2 is an edge view thereof, taken along lines 2-2 of FIG. 1.

DETAILED DESCRIPTION OF THE PREFERRED EMBODIMENT(S)

Figure 3:
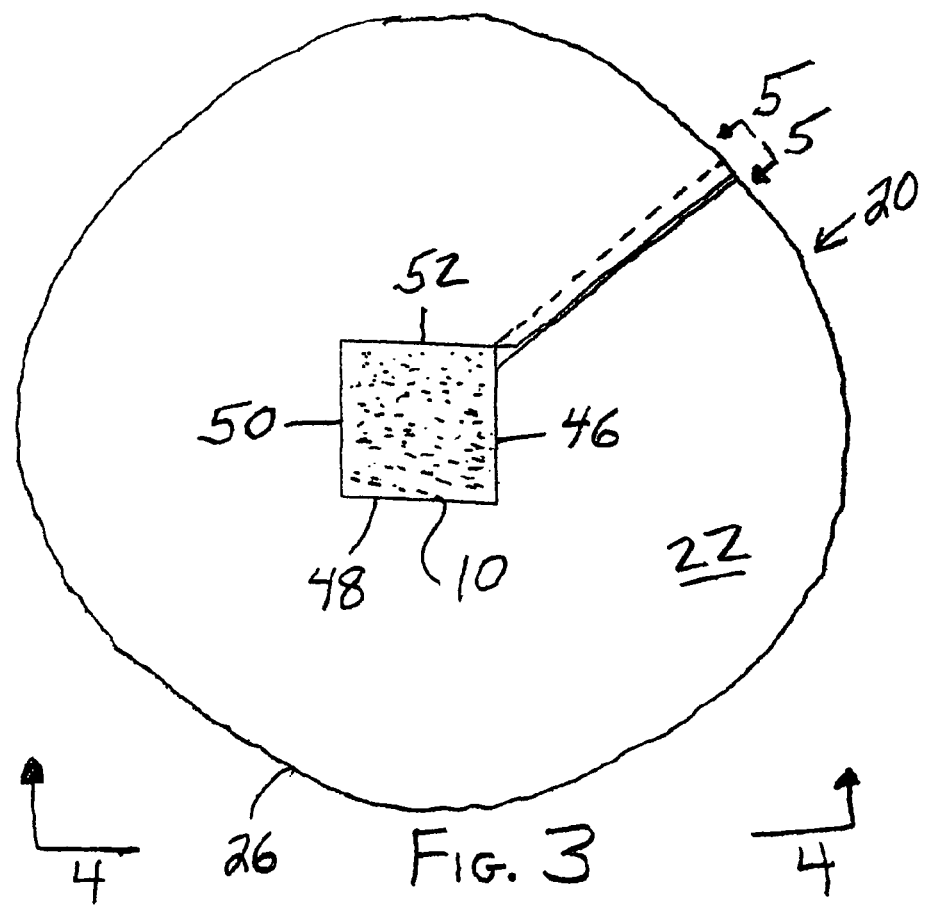
FIG. 3 is a view similar to that of FIG. 1 thereof, illustrated in a second shape in position around a post.
Figure 4:
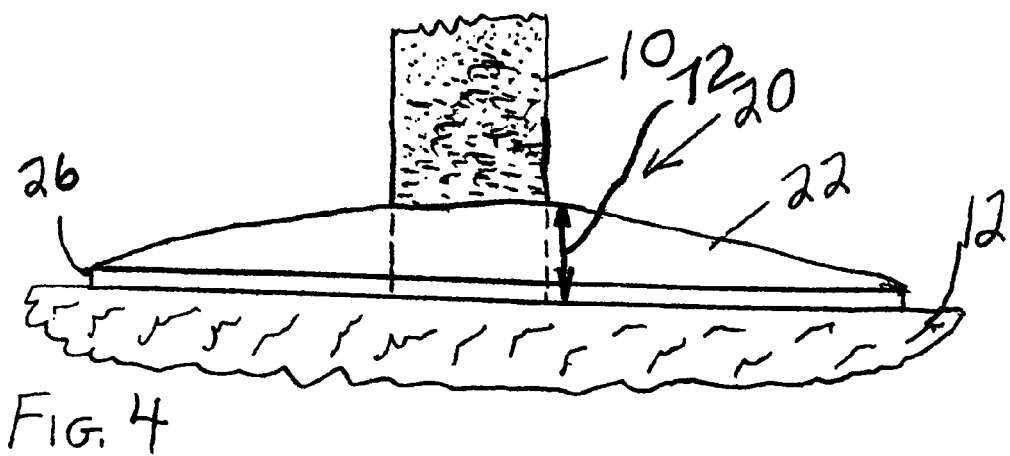
FIG. 4 is a view similar to that of FIG. 2 thereof, taken along lines 4-4 of FIG. 3.

Referring to FIGS. 3 and 4, there is shown at 10 a post or pole secured in the ground 12. The post 10 may, for example, be a sign post or a mailbox post or a fence post. While the post is shown to have a square cross-section, it should be understood that its cross-sectional shape may be round or any other suitable shape, for example, a telephone pole. While the present invention is described with reference to a device for application to a square post, it should be understood that the principles thereof may be applied to such other shapes of posts. The post 10 is preferably of a type which is mass produced to provide a multitude of such posts all having standard or identical cross-sectional shapes and sizes. While the present invention is particularly suitable for providing a multitude of identical devices for application to a multitude of mass produced posts all having the same shape and size cross-sectionally so that the devices may in turn be mass produced, the present invention is not limited thereto but is also applicable to, for example, tree trunks. For the purposes of this specification and the claims, the term "post" is defined to include poles, tree trunks, highway sign or marker posts, and other structures planted or otherwise secured in and rising from the ground.

Referring to FIGS. 1 and 2, there is shown generally at 20 a device for application about the post 10 to rest on and cover the adjacent ground 12 for preventing plant growth in an area around the post 10. The device 20 includes a thin flexible membrane or disc or sheet 22 which is sized to extend over the area in which it is desired to prevent plant growth and which is circular or otherwise suitably shaped. In order to prevent sunlight from reaching the ground around the post 10 and thereby prevent plant growth, the sheet 22 is composed of an opaque material, and particular suitable materials therefore are described in greater detail hereinafter.

The sheet 22 has a central opening, illustrated at 24, for receiving the post 10 therein. However, the opening 24 does not have to be located centrally of the sheet 22, but can be otherwise suitably within the perimetric edge 26 of the sheet 22. The opening 24 is shown in FIG. 1 (with the device in an open condition and not secured around the post 10) to approximate but does not exactly match the square shape of the post 10 for reasons that will become apparent hereinafter. In order to enable the sheet 22 to be provided around the post 10, it is slitted thereby defining a slit, illustrated at 28, extending entirely from the opening 24 to the perimetric edge 26, whereby the portions of the sheet on opposite sides of the slit 28 can be temporarily pulled apart to allow entry of the post 10 along the slit 28 and into the opening 24. While the slit 28 extends from a corner of the opening 24, it should be understood that it can extend from anywhere along the perimeter of the opening 24.

Figure 5:
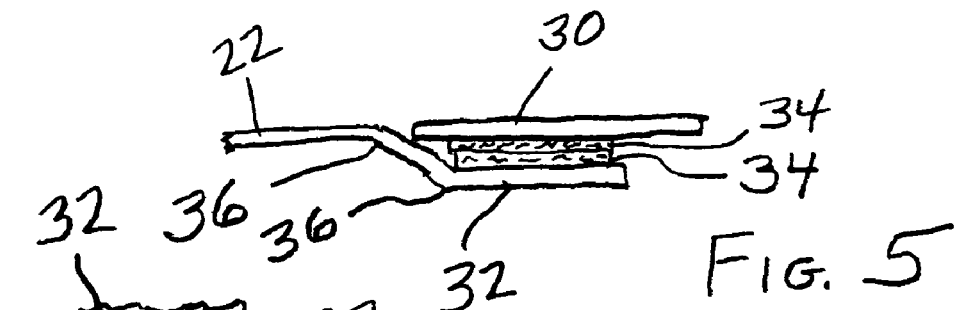
FIG. 5 is an enlarged partial edge view thereof taken along lines 5-5 of FIG. 3.

After the post 10 has been received within the opening 24, it is considered desirable to close the slit 28 in a manner to prevent the passage of sunlight therethrough to the underlying ground 12, which would undesirably allow plant/weed growth through the slit 28. Referring to FIG. 5, in order to prevent the passage of sunlight through the slit 28 and at the same time effect a desirable dome or convex shape to the sheet 22 for water drainage, the elongate sheet portions 30 and 32 adjacent and along the length of the slit 28 are caused to overlap (30 one on top of the other 32) and are attached together by suitable fasteners such as, for example, strips 34 of Velcro material or other suitable hook and loop fastener material (i.e., a plurality of hooks in one piece of material which attach to a plurality of loops in another piece of material to detachably attach the two pieces of material together, as commonly known in the art) sewed or otherwise suitably attached to the sheet portions 30 and 32 respectively. The sheet 22 may be suitably bent, as illustrated at 36, as needed so that portion 32 is suitably received under portion 30 in an aesthetic manner. As used herein and in the claims with reference to the sheet 22, by "flexible" is meant that the sheet 22 has sufficient flexibility to allow the portions 30 and 32 to be brought into overlapping relationship for attachment and to allow the sheet to assume the dome or convex shape. The thin sheet 22 desirably has generally uniform thickness over its area.

Figure 6:
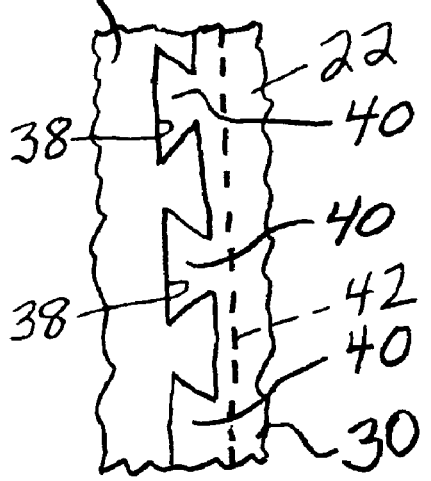
FIG. 6 is an enlarged partial plan view of an alternative embodiment thereof.

An alternative manner of attaching the overlapping portions 30 and 32 is illustrated in FIG. 6. As illustrated therein, lower portion 32 has formed in the edge thereof a series of longitudinally-spaced trapezoidal-shaped cut-outs or grooves, illustrated at 38, in which are respectively receivable a series of similarly longitudinally-spaced complementary trapezoidal-shaped projections or tongues 40 (commonly referred to as a "tongue-in-groove" connection. As seen, the trapezoidal shapes provide narrow throats to the grooves 38 to prevent dislocation of the tongues 40 therefrom. Such a tongue-in-groove connection allows the sheet 22 to be made in a single piece wherein the additional step of attaching Velcro strips or other attachment devices is desirably eliminated. If needed in such a tongue-in-groove connection or other connection to prevent the passage of sunlight between the tongues and grooves, the lower sheet portion 32 may be formed to have a lower sunlight-blocking flap or membrane, illustrated at 42, which extends under and beyond the grooves 38 thereby extending under the entirety of the tongue-in-groove connection.

Referring to FIG. 4 (FIGS. 3 and 4 illustrating the device 20 secured about post 10), the pulling of the portions 30 and 32 into the overlapping relationship illustrated in FIGS. 5 and 6 and lockingly attaching them together in such overlapping relationship is shown to have the desirable effect of giving the thin flexible sheet 22 a dome or convex shape wherein the sheet 22 slopes or inclines downwardly from the central opening 24, radially thereabout, to the edge 26 to thereby desirably allow water drainage from the sheet 22 to thereby prevent water build-up on the sheet 22 which, if occurs, may undesirably detract from its aesthetic appearance and which may promote undesired plant growth.

The sheet 22 (including the opening 24, the perimetric edge 26, and slit 28) is stamped or otherwise suitably cut-out or formed from a blank piece of flat material, as illustrated in FIGS. 1 and 2. Accordingly, when the slit portions 30 and 32 are thereafter brought into overlapping relationship for attaching around the post 10, the size and shape of the opening 24 will be slightly altered. As previously discussed, it is considered important to closely conform the opening 24 to the post 10 to prevent the entrance to the underlying ground 12 of sunlight. The square cross-sectional shape of the post 10 is illustrated in FIG. 1. In FIG. 3, the opening 24 is illustrated to be square and conform to the square shape of the post 10. Thus, the opening 24 is desirably stamped or formed to a suitable off-square or non-square shape, as seen in FIG. 1, so that, when the sheet 22 is formed with the portions 30 and 32 overlapping, the opening 24 becomes square-shaped and conforming to the square shape of the post 10, as seen in FIG. 3. The shape and size of the opening 24, as stamped or formed as seen in FIG. 1, may, for example, for a post having a square cross-section with widths of sides, illustrated at 44, of about 3 inches, the lengths of sides 46, 48, 50, and 52 may, for example, be about 3 9/16 inches, 3½ inches, 3½ inches, and 4 inches respectively. When the portions 30 and 32 are brought into overlapping relationship, it can be seen from FIG. 1 that the side 52 is brought into intersecting relationship with side 46 and extends beyond side 46 by about ½ inch, and a length of about 1/16 inch of the side 46 is resultingly "cut off" by the intersection of side 52 therewith thereby defining the opening 24 in FIG. 3 as having the lengths of all sides 46, 48, 50, and 52 being about 3 inches to tightly conform to the post 10 on all sides thereof. The size and shape of the opening to be stamped or formed in a flat blank can be selected, whether for a post having a square or round or other suitably-shaped cross-section to be received therein, using principles commonly known in the art to which the present invention pertains. Further, for example, the sheet 22 may have a diameter of about 18 inches, a thickness of about 1/32 inch, and overlapping portions 30 and 32 each having a width which tapers from about 3/8 inch at the opening 24 to about ¾ inch at the perimetric edge 26. When secured about post 10, the opening 24 may be at an height, illustrated at 72, of, for example, about inch from the ground 12. The examples provided herein are for the purposes of illustration and not for purposes of limitation.

For ease of manufacturing, the sheet 22 may be stamped or otherwise suitably formed as a single piece from a suitably resilient plastic (for example, recycled soda bottles) or from a suitably conformable rigid elastomeric or rubbery material. If made from a conformable elastomeric or rubbery material, the opening 24 may desirably be made slightly undersized to insure a tight conformable fit with the post 10.

Figure 7:
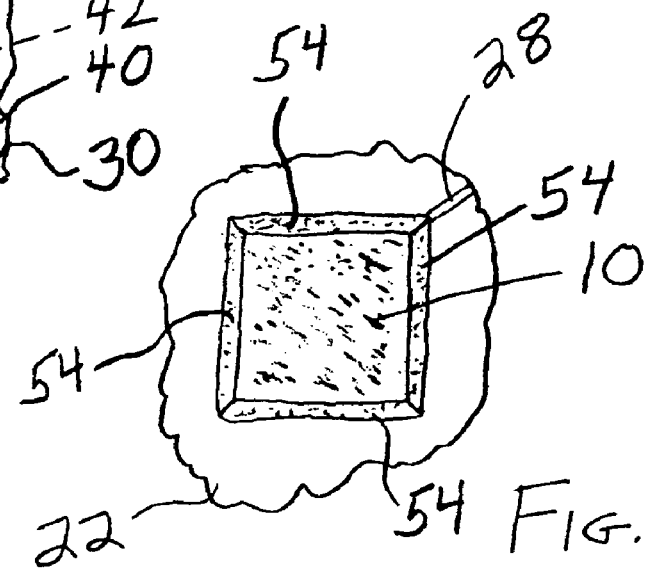
FIG. 7 is a partial plan view of another alternative embodiment thereof.

Referring to FIG. 7, in order to seal the opening 24 against the entrance of sunlight, an elastomeric or rubbery conforming material such as, for example, elongate bands 54 of elastomeric or rubbery material such as rubberized conformable cloth, is preferably sewn or otherwise suitably attached to the side edges 46, 48, 50, and 52 of the sheet opening 24. Over time, it is expected that heat may cause the rubbery material 54 to adhere to the post 10 thereby even further sealing against the entrance of sunlight.

While not shown in FIGS. 1 to 4 for purposes of ease of illustration, it should be understood that the opening 24 as shown therein is preferably provided with such rubbery strips 54 or other suitably rubbery conforming lining of the sides of the opening 24.

Figure 8:
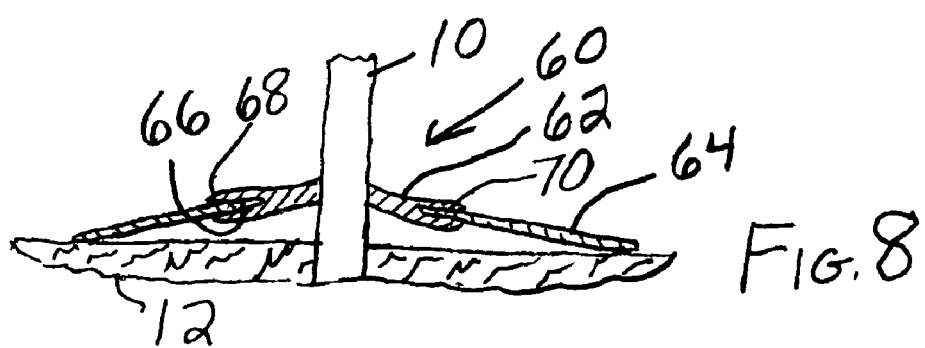
FIG. 8 is a schematic sectional view of yet another alternative embodiment thereof.

Referring to FIG. 8, there is shown a sunlight blocking device 60 in accordance with an alternative embodiment wherein it is made of two pieces, i.e., an inner piece 62 having the opening 24 and made of a more conformable material and a more rigid outer main body piece 64. The inner piece 62 is suitably formed to have a circumferentially extending groove, illustrated at 66, in its perimetric edge portion 68 for lockingly receiving the inner edge portion 70 of the outer piece 64, whereby the portions 68 and 70 overlap to prevent entrance of sunlight. It should of course be understood that the inner and outer pieces 62 and 64 may be otherwise suitably attached to prevent the entrance of sunlight. While the inner piece 62 is formed so that the opening 24 is specifically shaped to conform to the shape of the post 10 whereby a different inner piece would be provided for each different size/type of post, the outer piece 64 (as well as the inner piece edge portion 68) may desirably be universal, i.e., formed in a single size/shape to mate with any of a variety of inner pieces 62 so that the overall costs for providing the sunlight blocking devices 60 for a variety of different sizes/shapes of posts 10 may be desirably reduced.

In order to provide an aesthetically pleasing outdoors/grassy appearance, the visible upper surface of sheet 22 (as well as pieces 62 and 64) is preferably painted or otherwise suitably colored to match the color of the surroundings, i.e., the color and/or texture of the ground or other surface on which the sheet 22 is placed. For example, the sheet upper surface may be colored green to match the color of surrounding grass.

It should be understood that, while the present invention has been described in detail herein, the invention can be embodied otherwise without departing from the principles thereof, and such other embodiments are meant to come within the scope of the present invention as defined by the appended claims.

What is claimed is:

1. A device for preventing plant growth around a post comprising an opaque sheet having a perimetric edge, an opening in said sheet, a slit extending entirely from said opening to said edge and defining a pair of edge portions, a fastener structure arranged to fasten one of said edge portions to an other of said edge portions in a relationship wherein said one edge portion overlaps said other edge portion thereby effecting a slope of said sheet downwardly from said opening to said perimetric edge, and wherein said opening is shaped to have a first shape when said edge portions are not overlapping and to have a second shape to conform to the post when said edge portions are fastened in the overlapping relationship.

2. A device according to claim 1 further comprising elastomeric material lining said opening.

3. A device according to claim 1 wherein said sheet and said fastener structure are stamped as a single piece.

4. A device according to claim 1 wherein said fastener structure comprises hook and loop fastener material attached to each of said edge portions.

5. A device according to claim 1 wherein said fastener structure comprises a series of grooves in one of said edge portions and a series of tongues in an other of said edge portions which are lockingly receivable in said grooves respectively.

6. A device according to claim 1 wherein said sheet comprises an inner sheet portion having said opening, an outer sheet portion, and an attachment structure for attaching said outer sheet portion to said inner sheet portion in a manner such that said outer sheet portion overlaps said inner sheet portion.

7. A device according to claim 6 wherein said outer sheet portion is universally shaped for attachment to ones of said inner sheet portion formed for various sizes and shapes of the post.

8. A device according to claim 1 wherein a surface of said sheet is colored to match surroundings.

9. A device according to claim 1 wherein a surface of said sheet is colored green.

10. In combination with a post, a device for preventing plant growth around the post when the post is inserted in the ground, the device comprising an opaque sheet having a perimetric edge, an opening in said sheet, a slit extending entirely from said opening to said edge and defining a pair of edge portions, a fastener structure arranged to fasten one of said edge portions to an other of said edge portions in a relationship wherein said one edge portion overlaps said other edge portion thereby effecting a slope of said sheet downwardly from said opening to said perimetric edge, and wherein said opening is shaped to have a first shape when said edge portions are not overlapping and to have a second shape to conform to the post when the device is installed around the post with said edge portions fastened in the overlapping relationship.

11. A combination according to claim 10 wherein said post is of a type which has a standard cross-sectional shape and size.

12. A combination according to claim 10 further comprising elastomeric material lining said opening.

13. A combination according to claim 10 wherein said sheet and said fastener structure are stamped as a single piece.

14. A combination according to claim 10 wherein said fastener structure comprises hook and loop fastener material attached to each of said edge portions.

15. A combination according to claim 10 wherein said fastener structure comprises a series of grooves in one of said edge portions and a series of tongues in an other of said edge portions which are lockingly receivable in said grooves respectively.

16. A combination according to claim 10 wherein said sheet comprises an inner sheet portion having said opening, an outer sheet portion, and an attachment structure for attaching said outer sheet portion to said inner sheet portion in a manner such that said outer sheet portion overlaps said inner sheet portion.

17. A device according to claim 16 wherein said outer sheet portion is universally shaped for attachment to ones of said inner sheet portion formed for various sizes and shapes of said post.

18. A combination according to claim 10 wherein a surface of said sheet is colored to match surroundings.

19. A method for preventing plant growth around a post comprising providing an opaque sheet which has an opening and a slit extending from the opening to a perimetric edge of the sheet and wherein the opening is shaped and sized to have a first shape when the slit portions are not overlapping and to have a second shape to conform to the post when portions of the sheet along the slit are caused to overlap, manipulating the sheet so that the post is passed along the slit and into the opening, effecting movement of the sheet portions along the slit into an overlapping relationship, and attaching the sheet portions in the overlapping relationship.

20. A method according to claim 19 further comprising providing the post to be of a type which has a standard cross-sectional shape and size.

\* \* \* \* \*